UNITED STATES PATENT OFFICE.

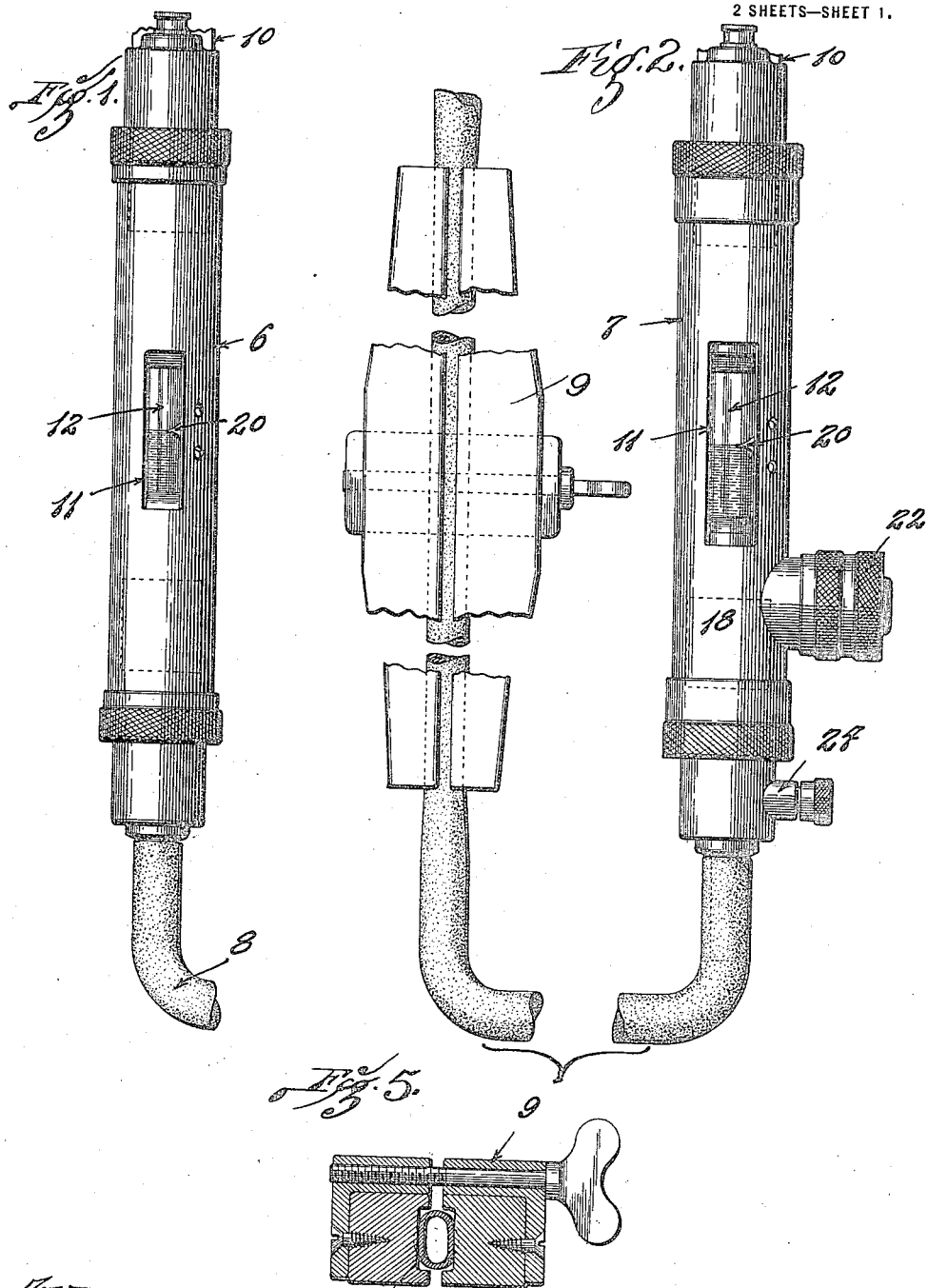

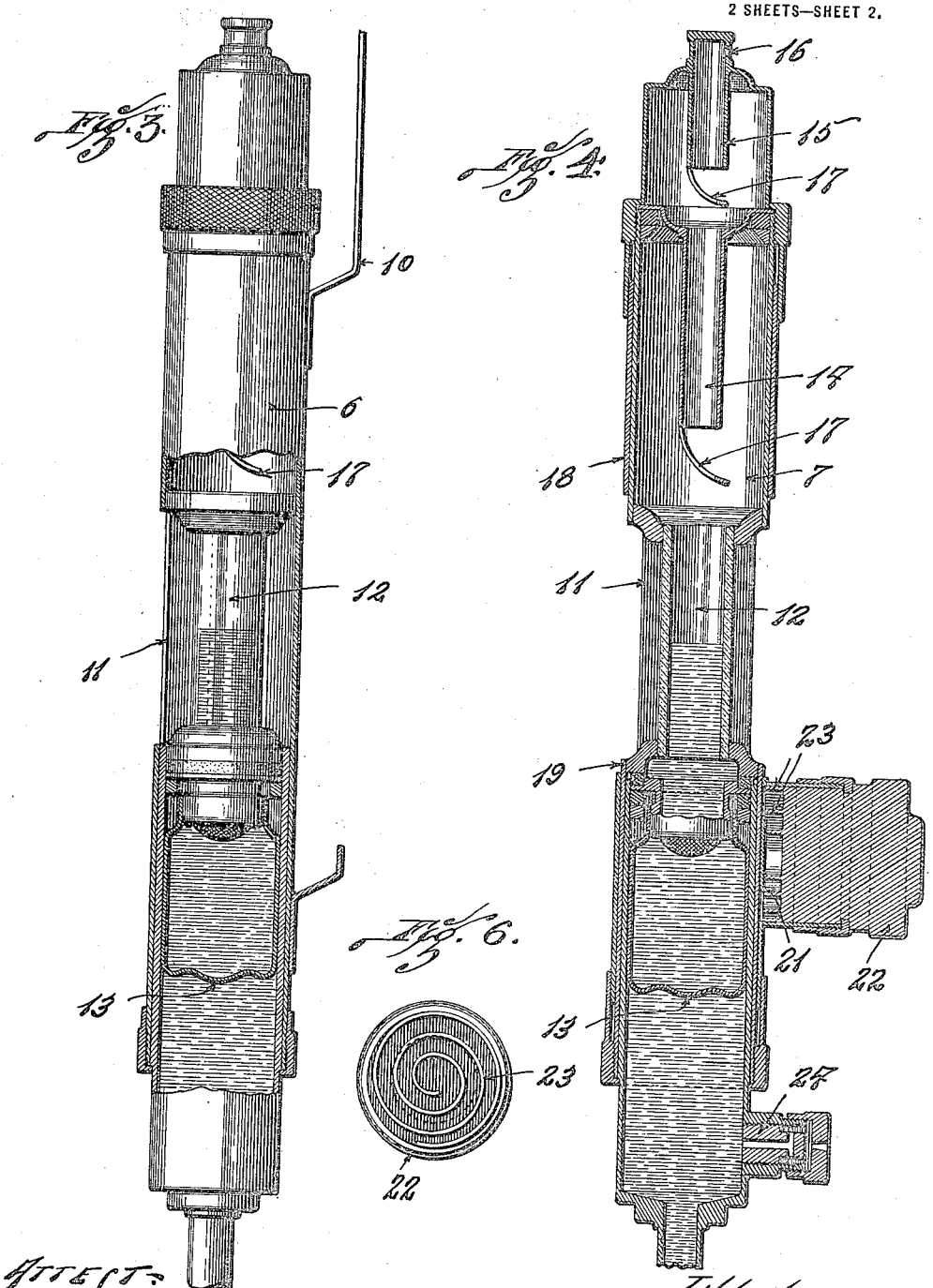

GUSTAV A. JENNING, OF EAST ST. LOUIS, ILLINOIS.

LEVELING INSTRUMENT.

1,216,129.  Specification of Letters Patent.  Patented Feb. 13, 1917.

Application filed August 11, 1913. Serial No. 784,159.

*To all whom it may concern:*

Be it known that I, GUSTAV A. JENNING, a citizen of the United States, and resident of East St. Louis, St. Clair county, Illinois, have invented certain new and useful Improvements in Leveling Instruments, of which the following is a specification containing a full, clear, and exact description, reference being had to the accompanying drawings, forming a part hereof.

My invention relates to improvements in leveling instruments of the fluid type as disclosed in my former Patents No. 872,183 issued November 26, 1907 and No. 1,060,602 issued May 6, 1913.

The object of my invention is to provide the leveling column as disclosed in my former patents with a flexible holder for a quantity of liquid which serves as a level indicating medium acted upon by a larger body of liquid, the said holder disposed in such manner as to reduce to a minimum the entrance of air to that portion of the instrument in which is confined the large leveling body of liquid.

A further object of my invention is to provide such an instrument with a novel means of venting that portion of the instrument in which is confined the leveling body of fluid.

And a still further object of my invention is to provide a novel trap for such instruments in which the desideratum is a continuously open port for the admission of air to the level indicating bodies of liquid.

With the above purposes in view my invention consists in certain novel features of construction and arrangement of parts as will be hereinafter more fully described, pointed out in the claims and illustrated by the accompanying drawings, in which—

Figure 1 shows in elevation, with certain parts broken away, one of the columns of an instrument constructed according to my invention;

Fig. 2 is a view similar to Fig. 1 of the other column;

Fig. 3 is an enlarged elevation partly in section of the column of my invention which is employed in connection with a given level;

Fig. 4 is a vertical sectional elevation of the column of my invention which is employed to establish a level obtainable from the column shown in Fig. 2;

Fig. 5 is a transverse sectional elevation of the tube clamp; and

Fig. 6 is a view of the operative face of the manipulative element for moving the indicator of the level establishing column.

Referring by numerals to the accompanying drawings:

6 designates the established level column, 7 the level establishing column, 8 a flexible tubular connection between the two columns and 9 a clamp arranged to act on the tubular connection between the two columns to compensate for a variation in the capacity of the tubular connection.

Each of the columns carries a pointer such as 10 and the figures show only the column 6 having such a pointer, but it is to be understood that the column 7 is provided with a like pointer. The pointer 10 is arranged to be employed with an established bench mark or level.

Each of the columns is provided with a sight opening 11 arranged to reveal a transparent water tube 12.

Suspended from said water tube or at least in communication therewith is a flexible water container 13.

Arranged in each column 6 and 7 above the water tube there is a water trap comprising two tubes 14 and 15, one arranged above the other, the uppermost tube having a port 16 for the admission of air to the trap to influence a body of water held within the water tubes 12 and the flexible containers 13.

Each of the tubes 15 has at its lowermost end a device 17 in the form of a curved integral strip forming a continuation of the tubes, whose offices are primarily to prevent drops of water from gathering at the mouths of said tubes which would interfere with the free passage of air therethrough.

The body portion of the column 7 comprises telescoping sections 18 and 19, the section 18 carrying the pointer 10 adjacent its top and also carries an indicator 20 adjacent the water tube 12, which indicator is visible through the opening 11.

The section 18 is movable relative to the section 19 which carries a fixed projection 21 which is acted upon by a manipulative member 22 having a helix 23 for engagement with the projection 21.

This manipulative member 22 has fixed relationship except for its rotation with the section 18. Section 19 is the section of the instrument that is fixed or held, and the water tube and flexible container 13 have fixed relationship with the section 19. By a manipulation of the member 22 the section 18, carrying the pointer 10 and indicator 20, may be moved vertically relative to the fixed section 19 as required to bring the indicator 20 to the level of the water in the tube 12.

One or the other of the columns 6 and 7, preferably the column 7, is provided with a valve 24, whose office is to exhaust or control the volume of water contained in the lowermost portion of the two columns and their tubular connection. This valve 24 comprises a stem, preferably formed as an integral part of the lowermost portion of either column 6 or 7, and which stem is internally threaded throughout its length to receive a plug, which has a bore extending a part of its length, communicating with a right angled bore, the part of the plug containing the last mentioned bore being of less diameter, or reduced, than the body of the plug, so that there will be a space between the plug and stem. Over the outer end of the stem there is a cap which is threaded to the stem and which has a vent hole in its end. It is obvious that when the cap is fully seated the vent hole is closed by engagement with the end of the plug and to open same it is only necessary to space the cap end from the plug.

By providing the traps at the tops of the two devices with the columns 17, I overcome one objectionable and annoying feature of leveling instruments of this type which has been the collection of a drop of water which would close the inlet to air which influenced the level indicating bodies of water.

By disposing the flexible water containers to comprise a part of the instrument holding the level indicating bodies of water and to arrange these flexible containers to be influenced only by the level establishing bodies of water the action of the rising and falling of the water in the two columns will not tend to draw air into the level establishing bodies of water.

By the provision of a valve forming a part of one of the columns a ready and efficient means is had for the variation of the level establishing body of water.

In the practical use of my invention the instrument 6 is established with relation to a fixed bench mark and the instrument 7 is carried to a distant point, where the same level as the bench mark is desired, the pointer 10 of the first instrument being placed a predetermined distance above the bench mark and the indicator 20 occupying a position having a fixed relationship with the pointer and adjacent the water tube 12. The second operator having charge of the distant instrument then manipulates the element 22 to raise or lower the pointer and indicator of the second instrument to the same horizontal plane as the pointer and indicator of the first instrument, guided of course by the height of water in the respective tubes.

I claim:

1. In a leveling instrument of the class described, a tubular element comprising telescoped sections, means for relatively moving the sections, a sight glass in the one section, a flexible container in open communication with the sight glass, a second tubular element of like structure with the first mentioned tubular element, a tubular means for connecting said elements, and an air vent for one of said tubular elements above said sight glass and flexible container.

2. In a leveling apparatus an instrument comprising a tubular body, a sight glass in said body, an open topped flexible sack in said tubular body in communication with the sight glass, a second instrument of like characteristics and a flexible tube for intercommunicatively associating the two instruments for the purposes stated.

3. In a leveling instrument, a container for a level indicating body of fluid, a trap in communication with said container, an air inlet for said trap, and means located at the discharge end of said inlet for preventing the accumulation of fluid.

In testimony whereof, I have signed my name to this specification, in presence of two subscribing witnesses.

GUSTAV A. JENNING.

Witnesses:
E. L. WALLACE,
N. G. BUTLER.

Copies of this patent may be obtained for five cents each, by addressing the "Commissioner of Patents, Washington, D. C."